US010802847B1

(12) United States Patent
Mahapatra et al.

(10) Patent No.: US 10,802,847 B1
(45) Date of Patent: Oct. 13, 2020

(54) SYSTEM AND METHOD FOR REPRODUCING AND RESOLVING APPLICATION ERRORS

(71) Applicant: AMAZON TECHNOLOGIES, INC., Seattle, WA (US)

(72) Inventors: Abinash Mahapatra, Cupertino, CA (US); David Sirbiladze, Boulder Creek, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 302 days.

(21) Appl. No.: 15/867,517

(22) Filed: Jan. 10, 2018

(51) Int. Cl.
*G06F 11/00* (2006.01)
*G06F 9/451* (2018.01)
*G06F 9/455* (2018.01)
*G06F 11/34* (2006.01)
*H04L 29/08* (2006.01)
*H04L 12/24* (2006.01)

(52) U.S. Cl.
CPC .......... *G06F 9/453* (2018.02); *G06F 9/455* (2013.01); *G06F 11/3438* (2013.01); *H04L 41/5074* (2013.01); *H04L 67/34* (2013.01); *H04L 67/14* (2013.01)

(58) Field of Classification Search
CPC .......... G06F 9/453; G06F 9/455; G06F 9/451; G06F 9/461; G06F 11/3438; G06F 11/34; G06F 11/3404; G06F 11/3409; G06F 11/3414; G06F 11/3466; G06F 11/3476; G06F 11/36; G06F 11/3604; G06F 11/3612; G06F 11/3636; H04L 41/5074; H04L 41/5061; H04L 41/5096; H04L 67/34; H04L 67/14; H04L 67/36

See application file for complete search history.

(56) References Cited

U.S. PATENT DOCUMENTS

| | | | | |
|---|---|---|---|---|
| 2005/0097197 | A1* | 5/2005 | Vincent | G06F 16/95 709/223 |
| 2008/0244325 | A1* | 10/2008 | Tyulenev | G06F 11/362 714/38.13 |
| 2009/0177926 | A1* | 7/2009 | Schneider | G06F 11/2294 714/37 |
| 2009/0199161 | A1* | 8/2009 | Cutler | G06F 11/366 717/124 |
| 2014/0365645 | A1* | 12/2014 | Sater | H04L 67/10 709/224 |

* cited by examiner

*Primary Examiner* — Anthony J Amoroso
(74) *Attorney, Agent, or Firm* — Lindauer Law, PLLC

(57) ABSTRACT

A user device may encounter an error while executing an application. The user device may send the error to customer service. Customer service may send a recording request to the user device and an application server. The recording request may include instructions that cause the user device to record an initial state of hardware data on the user device and to reproduce the error. The recording request may cause the application server to record the application requests it receives and the associated responses. Upon reproducing the error, the recording session may be terminated and session data that includes the recordings are sent to developers. The developers may replay the recording session in a simulator to reproduce and resolve the error. The developers may generate application update data that resolves the error and may send the data to the user devices that reported the error.

20 Claims, 8 Drawing Sheets

Continued from FIG. 3

SYSTEM AND METHOD FOR REPRODUCING AND RESOLVING APPLICATION ERRORS

BACKGROUND

A major issue for developers trying to resolve errors occurring within an application is the in-ability to reproduce the errors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
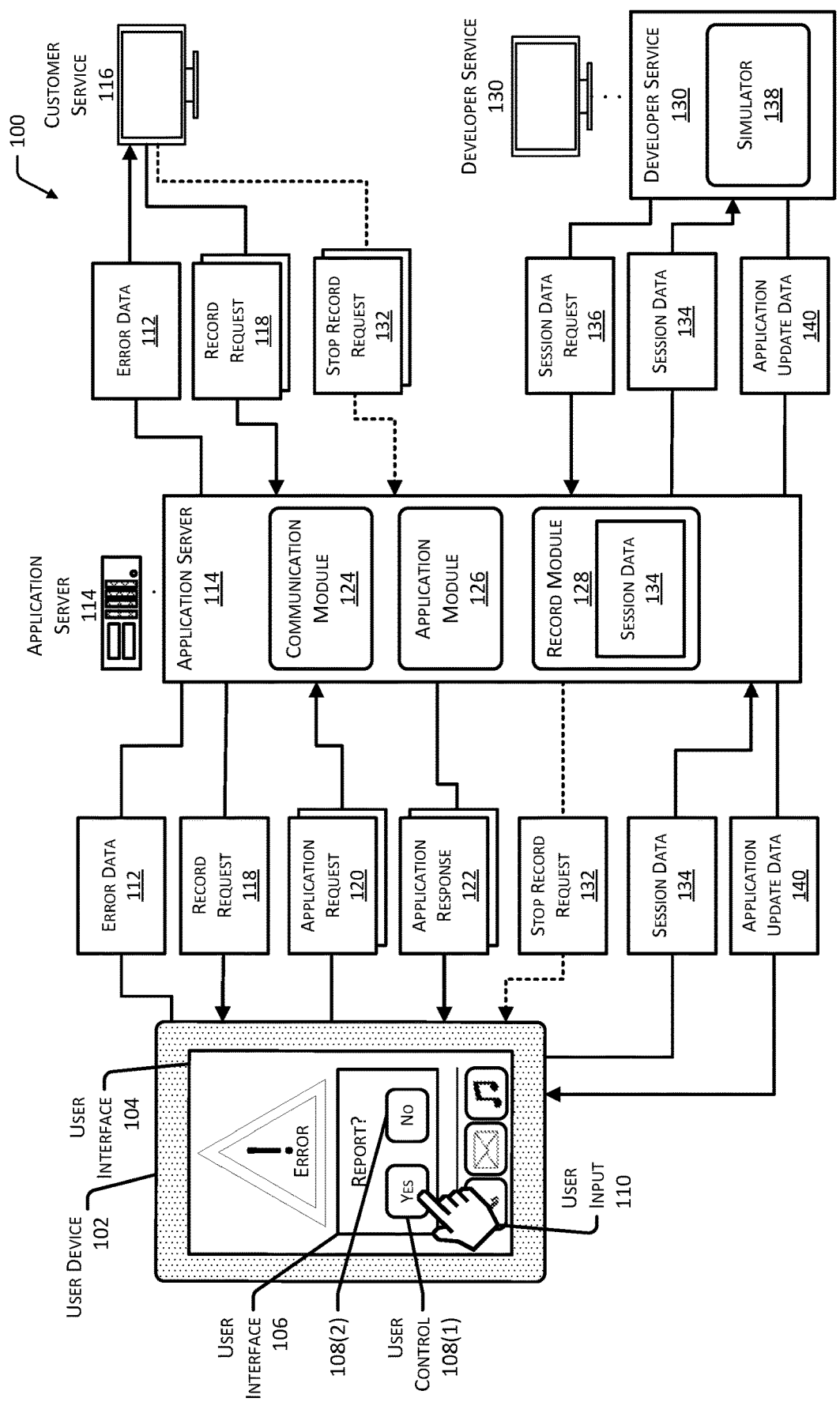
FIG. 1 depicts a schematic of a system for reproducing and resolving application errors.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Users are able to access applications, via networks such as the Internet, to purchase items, view content, access information, and so forth. While the user is accessing an application, via their user device, an error or issue may occur. For example, the user device may be accessing a shopping application to purchase an item. During operation of the shopping application an error may occur. The error may be the shopping application crashing, user controls not appearing, user controls not functioning, information not loading, and so forth. The user may contact customer service about the error. For example, the user may initiate a phone call, a live chat session, generate a ticket indicating the error, and so forth. The customer service, with the user's consent, may record a screen sharing session with the user and forward the recording and ticket describing the error to the developers. For example, the user device may present a user interface that includes controls that allow the user to confirm or deny the screen sharing session.

The developers may attempt to resolve the error by attempting to reproduce it. The developers may have difficulty reproducing the errors because the recorded session and ticket do not include information associated with the user device or an application server. The information may include hardware data of the user device or the interactions with the application server. For example, the hardware data may include the amount of cache available, amount of cache being used by the application and other applications, the amount of memory available, the number of threads available, data buffer being used, and so forth. The interactions with the application server may include application requests sent by the user device to the application server, the application server responses that correspond to the requests, timing of the responses, latency between receiving the request and responding, and so forth. By not having the hardware data of the user device and the interactions with the application server, the developers are not able to reproduce the errors that the user was experiencing because the developers cannot create the conditions the user device was in. By not being able to reproduce the errors, the developers are not able to resolve the errors, which leads to a decrease in user experience. In addition, the amount of resources consumed may increase. For example, the amount of network bandwidth consumed may increase as the developers attempt to rerun the problem multiple times and when the error is corrected the developers may send the updated application data to all the user devices, rather than the user devices that have reported the errors.

This disclosure describes systems and methods for reproducing and resolving application errors. As described above, the user device may generate an error when accessing or using an application. For example, the shopping application may crash while being used. The user device may generate error data. The error data may include a ticket that describes that an error occurred. The user device may send the error data to customer service. The customer service may send a record request to the user device and the application server. The record request may also include a request for the user to attempt to reproduce the error.

The user device may be configured to generate a session identification to identify the recording session. For example, the session identification may identify the user device, an account number, ticket number reporting the error, date, time, and so forth. The user device may record the initial state of the hardware data prior to sending the application requests. The user device may record the state of the manager controller. For example, the user device may record that the state of the manager controller indicates that three (3) applications on the user device are currently running in the foreground or background. The user device may also capture the state of the click handler. For example, the user device may record what the user selected, when it was selected, where the selection occurred on the user interface, and so forth. The user device may also record the user device type, memory profile of the user device, central processing unit (CPU), software version of the application, and so forth.

The user device may send application requests to the application server. The application server may send application responses that correspond to the application requests. The server may generate a session identification, as described above. The user device or the application server may record the sending and receiving of the application requests and application responses. The recording of the application responses may include recording the information within the application responses. For example, the application server may receive a request to view a particular item.

The application server may generate a response that enables the user device to present an application user interface that allows the user to view the particular item. The application server may record the data or instructions of the response that enable the user device to present the application user interface. The user device or the application server may also record the timing of the responses, latency between receiving the request and responding, and so forth. The user device may continue sending the application requests until the user is able to reproduce the error.

Once the error has been reproduced, customer service may send a stop record request to the user device and the application server. In other implementations, the user device or the application server may determine that the error has occurred and may stop recording the session. In another implementation, the recording session may end after a period of time has expired. For example, the recording session may end after two (2) minutes. The user device may send session data indicative of the recorded session and the session identification to the application server. The application server may combine the received session data with its own session data and store the combined session data. In other implementations, the application server may store the received session data and associate it with its own session data.

A developer may send a session data request to the application server. The session data request may include the ticket number or the session identification that was included in the ticket, as described above. The application server may identify the session data based on the ticket number and send the corresponding session data to the developer. The developer may replay the session data in a simulator. The simulator may run the session data to generate the error. For example, the simulator may run the session data to reproduce the shopping application crashing, as described above. The developer upon identifying the error may generate application update data. The application update data may include changes to the code implemented by the developer to resolve the error. The developer may run the application update data in the simulator to determine whether the changed code resolves the error. For example, the developer may run the changed code to determine whether the shopping application continues to crash. The simulator module may also test the application update data. For example, a simulator module may use validation testing to verify that the shopping application which was previously developed and tested still performs the same way after the application update data is implemented. The developer may send the application update data to the application server. The validation testing may include regression testing, stress testing, usability testing, and so forth. The application server may be configured to send the application update data to the user device. In other implementations, the application server may send the application update data to the user devices that reported the error.

By using the techniques and systems described above, for example recording the initial state of the hardware data and interactions with the application server, the amount of human resources is reduced. There is a reduction in human resources because the developers are able to reproduce the error the first time they replay the session data. The user experience is improved because developers are able to resolve the error and generate application update data. The application update data enables the application to operate properly and allows the user to access and interact with the application. In addition, by using the techniques and systems described above, there is a reduction and more efficient use of network bandwidth. There is a reduction and more efficient use of network bandwidth because by recording the initial state of the hardware data and the interactions with the application server the system does not need to rerun the attempt of reproducing the reported error multiple times. Rather, developers are able to request the session data, replay the session data in the simulator, and then be able to identify the error. In addition, there is a reduction and more efficient use of network bandwidth because the system is able to send the application update data to the user devices that incurred the problem or are likely to incur the problem, rather than sending the application update data to every user device that has the application installed on their user device.

Illustrative System

FIG. 1 depicts a schematic of a system 100 for reproducing and resolving application errors. The system 100 may include a user device(s) 102 that includes a touchscreen, mouse, or other input device as well as a display device to present a user interface 104. The user device 102 may be a television, tablet computer, personal computer, electronic book reader, gaming console, set-top box, media player, in-vehicle entertainment system, smartphone, server, device control system, a voice activated device, and so forth. The user device 102 may utilize automated speech recognition or other techniques to receive and analyze audible user inputs.

The user device 102 may include a user interface 104. The user interface 104 may be configured to present an application user interface. For example, the application user interface may be associated with a shopping application, entertainment application, lifestyle application, medical application, health and fitness application, music application, social networking application, and so forth. While the user is accessing the application, via the user device 102, an error or issue may occur. For example, the user device 102 may be accessing a shopping application to purchase an item. During operation of the shopping application an error may occur.

The error may comprise an application fault. For example, the application fault may be from the application attempting to read memory that is not allocated for reading by the application. In other implementations the application fault may be from the application attempting to write to memory that is not allocated for writing by the application, executing an invalid instruction, performing input/output operations on a hardware device to which the application does not have permission to access, or sending an invalid request to an operating system of the user device 102.

In other implementations, the error may comprise the user device 102 omitting a display of an element on the user interface 104. For example, the element may comprise an image of an item, item information, user controls, and so forth. In this example, the user device 102 may omit displaying a user control that enables the user to purchase an item. The error may also comprise a non-response user control. For example, the user may attempt to select a user control to view a particular description page of an item. In this example, the user device 102 may receive multiple user inputs or a user input attempting to select the user control, however, the user control may be non-responsive to the user input. In this example, the user device 102 may not be able to display the particular description page of the item.

The user interface 104 may be configured to present a user interface 106. The user interface 106 may include user controls 108(1) and 108(2) which ask the user whether they would like to report the error. The user control 108(1) may enable a user to select a "yes" user control and the user control 108(2) may enable a user to select a "no" user control. The "yes" user control 108(1) may cause the user device 102 to contact customer service about the error. For example, the user device 102 may initiate a phone call, a live chat session, generate a ticket indicating the error, and so forth. The "no" user control 108(2) may cause the user device 102 to close the application. For example, the user device 102 may close or shut down the shopping application.

The user device 102 may receive user input 110 selecting the user control 108(1). The user device 102 may generate error data 112 in response to the user input 110. The error data 112 may include a ticket that describes that an error occurred. For example, the ticket may include a ticket number that may be used to identify the user, the user device 102 or may be used to retrieve the error data 112 at a later time. The ticket may also include a description of the error. For example, the ticket may describe that a user control is non-operable, an image of an item may not be displayed, that the application is not functioning correctly, and so forth. The user device 102 may send the error data 112 to application server 114. The application server 114 may send the error data 112 to customer service 116. In other implementations, the user device 102 may send the error data 112 to customer service 116.

The customer service 116 may be a user that accesses a customer service device. The customer service 116 may send a record request 118 to the application server 114 and the user device 102. The record request 118 may include instructions that cause the user device 102 to record, with the user's consent, the initial state of hardware data within the user device 102. For example, the user device 102 may present a user interface 104 that includes controls that allow the user to confirm or deny the recording of the initial state of the hardware data. For example, the user device 102 may record the initial state of the hardware data prior to sending the application request 120. The user device 102 may record the state of the manager controller. For example, the user device 102 may record that the state of the manager controller includes that three (3) applications on the user device 102 are currently running in the foreground or background. The user device 102 may also capture the state of the click handler. For example, the user device 102 may record what the user selected, when it was selected, where the selection occurred on the user interface 104, and so forth. The user device 102 may also record the user device type, memory profile of the user device 102, central processing unit (CPU), software version of the application, and so forth. The record request 118 may also include instructions to cause the user device 102 to reproduce the error associated with the error data 112.

The record request 118 may also include instructions that cause the application server 114 to record an application request 120 received from the user device 102 and an application response 122 that corresponds to the application request 120. In other implementations, the customer service 116 may send the record request 118 to the user device 102. The record request 118 may include instructions to cause the user device 102 to record the application request 120 sent to the application server 114 and the application response 122 sent from the application server 114.

The user device 102 may send the application request 120 to the application server 114. For example, the application request 120 may be a user input selecting an application to be executed, a user input selecting to view a particular item, a user input selecting to purchase an item, a user input navigating the user interface of the application, and so forth.

The application server 114 may be configured to receive the application request 120. The application server 114 may include a communication module 124, an application module 126, a record module 128, and so forth. The communication module 124 may be configured to send data, requests, responses, and so forth, to the customer service 116, the user device 102, a developer service 130, and so forth. For example, the application server 114 may send the error data 112 to the customer service 116, the record request 118 to the user device 102, the application response 122, and so forth. In some implementations, the communication module 124 may send multiple application responses 122. The sending of the application responses 122 may be based on prioritized information. For example, the communication module 124 may have in a queue an application response 122(1) that corresponds to an application request 120(1) from a user device 102(1), an application response 122(2) that corresponds to an application request 120(2) from a user device 102(2), an application response 122(3) that corresponds to an application request 120(3) from a user device 102(3), and so forth. In this example, the prioritized information may indicate that the application response 122(3) is to be sent first, then the application response 122(1) and then the application response 122(2). In some implementations, the application server 114 may record the application requests 120 and the application responses 122 associated with other user devices to capture the total workload of the application server 114.

In other implementations, the communication module 124, while recording the application request 120 and the application response 122, may capture additional information. The additional information may include response sequence information that is included with the application response 122 and indicates that the application response 122 was received. For example, as described above, the communication module 124 may record that the application response 122 may be the third application response 122 that has been sent to the user device 102. The additional information may also include response timing information that indicates elapsed time between the application request 120 and the application response 122. For example, the elapsed time between the receipt of the application request 120 and the sending of the application response may be three (3) seconds. The additional information may also include response latency information that indicates elapsed time for an application response 122 to be received. For example, the response latency information may indicate that it took two (2) seconds for the application response 122 to be received by the user device 102. The communication module 124 may also capture the information within the application response 122. For example, the application server 114 may receive the application request 120 that indicates that the user has selected to view an item and a description associated with the item. The application server 114 may generate the application response 122 that includes information that enables the user device 102 to present an application user interface that includes an image of the item and a description associated with the item. The communication module 124 may record the above described information.

The application module 126 may be configured to generate the application response 122. For example, the application module 126 may receive the application request 120 that indicates that the user selected to launch the shopping application. The application module 126 may generate the application response 122 to include application data that enables the user device 102 to present the shopping application user interface. In another example, the application module 126 may receive the application request 120 that indicates that the user selected to purchase a particular item.

The application module 126 may generate the application response to include application data that enables the user device 102 to present a user interface that indicates the user selection, cost of the item, shipping method, payment, and so forth. The application module 126 may continue to receive the application request 120 and send the corresponding application response 122 until the error has been reproduced on the user device 102. For example, the user device 102 may send the application request until an application fault occurs that causes the application to close. In this example, the closing of the application causes the user device 102 to determine that the error has occurred.

In one implementation, the customer service 116 may send a stop record request 132 to the application server 114 and the user device 102. The stop record request 132 may include instructions that cause the application server 114 and the user device 102 to stop the recording session. The user device 102 may be configured to generate a session identification to identify the recording session. For example, the session identification may identify the user device 102, an account number, ticket number reporting the error, date, time, and so forth. The application server 114 may also generate a session identification that corresponds to the session identification generated by the user device 102. The user device 102 may generate session data 134. The session data 134 may include the recorded initial state of the hardware data, the application request 120, and the application response 122, as described above. In other implementations, the session data 134 may include the recorded initial state of the hardware data. In yet another implementation, the session data 134 may also include user device information that indicates a user device type or an operating system of the user device 102. The session data 134 may also include application information that indicates a software version of the application. The user device 102 may send the session data 134 to the application server 114.

The application server 114 may store the session data 134 within the record module 128. The record module 128 may combine the session data 134 with its own session data and store the session data 134 as combined. In other implementations, the record module 128 may store the session data 134 and associate it with its own session data.

In other implementations, the user device 102 may initiate the recording session. In this implementation, the user device 102 may record the hardware data, as described above. The user device 102 may send the record request 118 to the application server 114. In other implementations, the user device 102 may record the sending of the application request 120 and the application response 122. The user device 102, upon determining that the error has occurred, may be configured to stop the recording session and generate the session data 134, as described above. In some implementations, the user device 102 may send the stop record request 132 to the application server 114. The user device 102 may send the session data 134 to the application server 114. The application server 114 may store the session data 134, as described above.

In other implementations, the recording session may be based on a period of time. For example, the user device 102 or the application server 114 may stop the recording session based on a period of time expiring. The record request 118 may include instructions that after two (2) minutes have elapsed that the user device 102 or the application server 114 may stop the recording session. After the recording session has been stopped the user device 102 may generate the session data 134, as described above.

The application server 114 may receive a session data request 136 from the developer service 130. The developer service 130 may be a user that accesses a developer user device. The developer user device may be a user device, as described above. The session data request 136 may include the session identification, the account number, the ticket number reporting the error, and so forth. The record module 128 may correspond the session identification sent in the session data request 136 to the session identification within the stored session data. For example, the record module 128 may correspond that the session data request 136 corresponds with the session data 134. The application server 114 may send the session data 134 to the developer service 130.

The developer service 130 may include a simulator 138. The developer service 130 may replay the session data 134 in the simulator 138. The simulator 138 may determine that the error occurred. For example, as described above, the simulator 138 may determine an application fault, that a user control is non-operable, an image of an item may not be displayed, that the application is not functioning correctly, and so forth. The developer service 130 may generate application update data 140 that includes modified instructions that resolve the error. For example, the modified instructions may cause the application to function correctly, make a user control operable, display an image correctly, and so forth. The developer service 130 may perform a validation test in the simulator 138 using the application update data 140 to determine that the application remains functional after inclusion of the modified instructions. For example, the validation test may be a regression test. The regression test may be a type of software testing which verifies that the application which was previously developed and tested still performs the same way after it was changed. The changes may include modified instructions, patches, configuration changes, and so forth. During regression testing, new faults or errors may be uncovered. In some implementations, an impact analysis may be performed in the simulator 138 to determine what areas could be affected by the modified instructions. These areas may include functional and non-functional areas of the system. The purpose of validation testing is to ensure that the application update data 140, as described above, does not introduced new errors or faults. The developer service 130 may send the application update data 140 to the user device 102, via the application server 114. In other implementations, the developer service 130 may send the application update data 140 to the user device 102. In another example, the validation test may be automated testing. Automated testing may include software that controls the execution of tests and the comparison of actual outcomes with predicted outcomes. In other examples, the validation test may be alpha testing. Alpha testing may identify any possible issues or errors in the application update data 140.

In other implementations, the application server 114 may include the simulator 138. In this implementation, the application server 114 upon receipt of the session data 134, may replay the session data 134 with the simulator 138, as described above. The application server 114, via the record module 128, may access second session data indicative of a previous recorded session encountering the error. For example, the user device 102(2) may have previously encountered the error and generated second session data, as described above. The record module 128 may store the second session data to enable the application server 114 to access it at a later time for determining how to resolve the error in the session data 134. The application server 114 may also access rule data. The rule data may indicate a list of errors that can be resolved by an automated assessment module. The automated assessment module may be located at the application server 114. The simulator 138 may determine that the error has occurred. The application server 114 may determine that the error in the session data 134 corresponds to an error included in the list of errors indicating that the error can be resolved by an automated assessment module. For example, the list of errors may include that the automated assessment module may resolve errors that include a user-control not being operable. The application server 114 may send the session data 134 to the automated assessment module. The automated assessment module may generate the application update data 140, as described above. The simulator 138 may perform the validation test using the application update data 140, as described above. The application server 114 may send the application update data 140 to the user device 102. In other implementations, where the determined error is not included in the list of errors, the session data 134 may be sent to the developer service 130 to be resolved, as described above.

In another implementation, the application server 114 may be configured to monitor, with the user's consent, the user device 102 to determine whether the user device 102 is compromised. For example, the user device 102 may present a user interface that includes controls that allow the user to confirm or deny allowing the application server 114 to monitor the user device 102. The application server 114 may include information that indicates configurations of user devices that are not compromised. For example, the application server 114 upon receipt of the application request 120 may compare the application request 120 to application requests sent from user devices that are not compromised. The application server 114, based on the comparison, may determine that the user device 102 is compromised. For example, the application server 114 may determine that the user device 102 includes malicious software. The malicious software may include computer viruses, worms, trojan horses, ransomware, spyware, adware, scareware, other malicious programs, and so forth. The application server 114 may send an alert to the user device 102 indicating that the user device 102 is compromised. The application server 114 may also generate a notification that indicates that the user device 102 may not be able to send the application request 120 or receive the application response 122 until the user device 102 is able to remove the malicious software. The user device 102 may be able to notify the application server 114 that the malicious software has been removed before sending a notification to the application server 114. In other implementations, the user device 102 may contact the customer service 116 to indicate that the malicious software has been removed. The customer service 116 may send a notification to the application server 114 indicating that the user device 102 has removed the malicious software.

In yet another implementation, the application server 114 may be configured to monitor, with the user's consent, the user device 102 to determine whether the user device 102 is compromised. For example, the user device 102 may present a user interface that includes controls that allow the user to confirm or deny allowing the application server 114 to monitor the user device 102. The application server 114 may include information or process flow information that indicates configurations of user devices that are not compromised. For example, the application server 114 may replay the session data 134 in the simulator 138 and compare the process flow information of the session data 134 to the stored process flow information. The application server 114 may determine that the user device 102 is compromised based on a difference in the process flow information of the session data 134 and the stored process flow information. The application server 114 may generate an alert or notification, as described above.

In one implementation, the user device 102, the application server 114, the customer service 116, the developer service 130, and so forth, may be located at location(s) that are remote to each other, on different networks, and that are in communication with the each other using different networks. For example, the user device 102 may communicate with the application server 114 via Wi-Fi. The application server 114 may communicate with the developer service 130 via the Ethernet.

Figure 2:
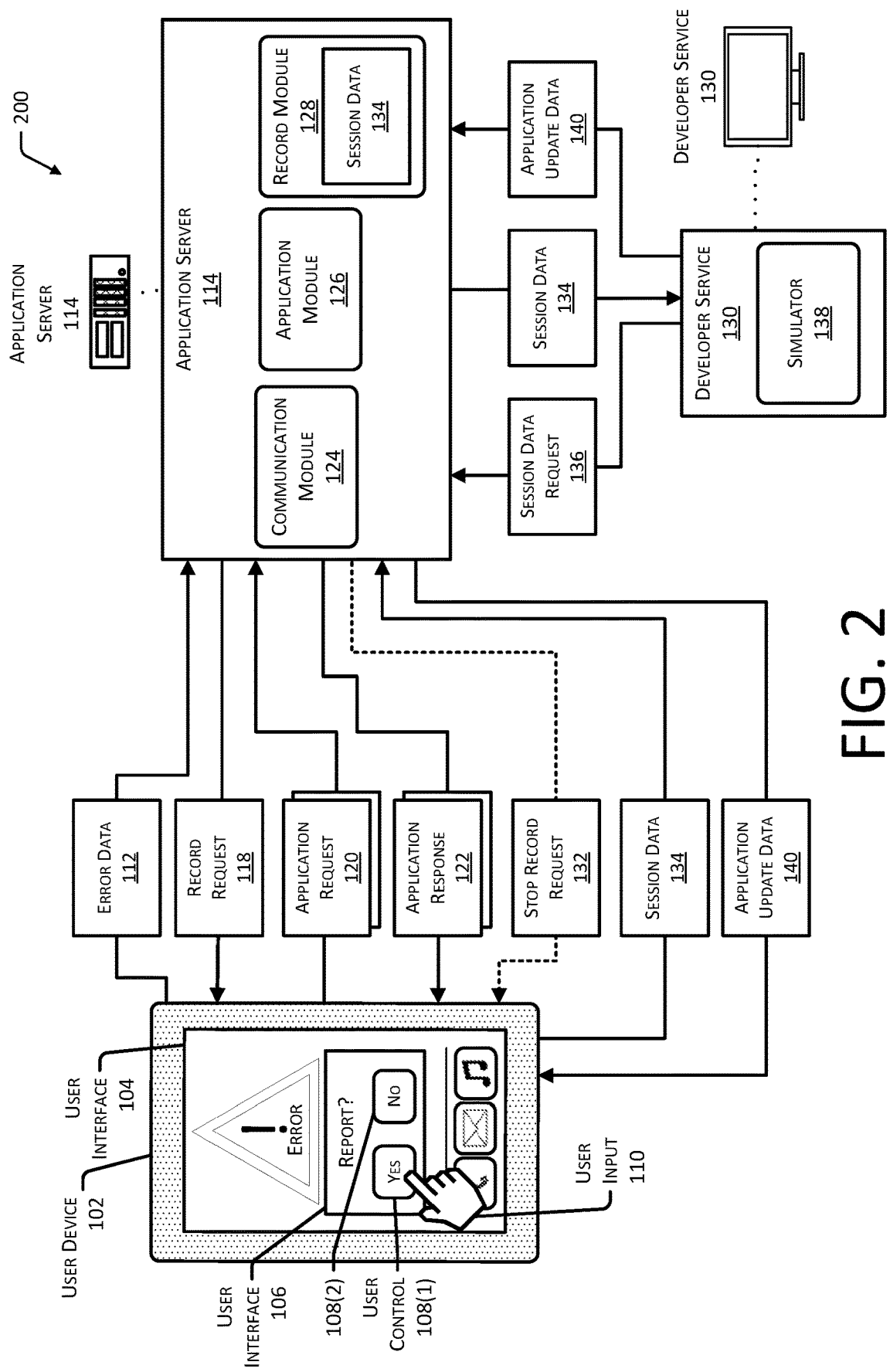
FIG. 2 depicts a schematic of a system for reproducing and resolving application errors.

FIG. 2 depicts a schematic of a system 200 for reproducing and resolving application errors. The system 200 may include the user device 102. The user device 102 may include the user interface 104. The user interface 104 may be configured to present the application user interface, as described above. While the user is accessing the application, via the user device 102, an error or issue may occur. For example, the user device 102 may be accessing a shopping application to purchase an item. During operation of the shopping application an error may occur, as described above. For example, the error may comprise the user device 102 omitting a display of an element on the user interface 104. The element may comprise an image of an item, item information, user controls, and so forth.

The user interface 104 may be configured to present the user interface 106. The user interface 106 may include user controls 108(1) and 108(2) which ask the user whether they would like to report the error. The user control 108(1) may enable a user to select a "yes" user control and the user control 108(2) may enable a user to select a "no" user control, as described above.

The user device 102 may receive the user input 110 selecting the user control 108(1). The user device 102 may generate the error data 112 in response to the user input 110. The error data 112 may include a ticket that describes that an error occurred, as described above. For example, the ticket may include a ticket number that may be used to identify the user, the user device 102, or may be used to retrieve the error data 112 at a later time. The ticket may also include a description of the error, as described above. For example, the ticket may describe that the image of an item is not being displayed. The user device 102 may send the error data 112 to application server 114. The application server 114 may initiate a recording request to generate a recording session that records the initial state of hardware data within the user device 102 by sending the record request 118. In other implementations, the user device 102 may initiate the recording session by sending the record request 118 to the application server 114.

The record request 118, as described above, may include instructions that cause the user device 102 to record, with the user's consent, the initial state of the hardware data within the user device 102. For example, the user device 102 may present a user interface that includes controls that allow the user to confirm or deny recording the initial state of the hardware data. The user device 102 may record the state of the manager controller which indicates the number of applications on the user device 102 that are currently running in the foreground or background. In other implementations, the record request 118 may include instructions that cause the application server 114 to record the application request 120, the application response 122, and the additional information, as described above.

The user device 102 may send the application request 120 to the application server 114, as described above. For example, the application request 120 may be a user input selecting to view a particular item.

The application server 114 may be configured to receive the application request 120. The application server 114 may include the communication module 124, the application module 126, the record module 128, and so forth, as described above. The communication module 124 may be configured to send data, requests, responses, and so forth, to the user device 102 or the developer service 130, as described above. The communication module 124 may also be configured to record the application request 120, the application response 122, the information included in the application response 122, and the additional information, as described above.

The application module 126, as described above, may be configured to generate the application response 122. For example, the application module 126 may receive the application request 120 that indicates that the user selected to view a particular item. The application module 126 may generate the application response 122 to include application data that enables the user device 102 to present an image of the particular item. The application module 126 may continue to receive the application request 120 and send the corresponding application response 122 until the error has been reproduced on the user device 102. For example, the user device 102 may continue to send application requests 120 until it determines that the previously omitted element has been omitted again. As described above, once the error has been reproduced the stop record request 132 may be sent, as described above.

In one implementation, the user device 102 may determine that the error has occurred. For example, the user device 102 may determine that the element, which was previously omitted as described above, is currently omitted from being displayed. The application server 114 may send the stop record request 132 to the user device 102. The stop record request 132 may include instructions that cause the application server 114 and the user device 102 to stop the recording session, as described above. In other implementations, the user device 102, upon determining that the error has occurred, may stop the recording session without the receipt of the stop record request 132.

The user device 102 may be configured to generate the session identification to identify the recording session, as described above. For example, the session identification may identify the user device 102, an account number, ticket number reporting the error, date, time, and so forth. The application server 114 may also generate a session identification that corresponds to the session identification generated by the user device 102, as described above. The user device 102 may generate the session data 134, as described above. For example, the session data 134 may include the recorded initial state of the hardware data. The user device 102 may send the session data 134 to the application server 114.

The application server 114 may store the session data 134 within the record module 128, as described above. The application server 114 may receive the session data request 136 from the developer service 130, as described above. The session data request 136 may include the session identification, the account number, the ticket number reporting the error, and so forth. The record module 128 may correspond the session identification sent in the session data request 136 to the session identification within the stored session data. For example, the record module 128 may correspond that the session data request 136 corresponds with the session data 134. The application server 114 may send the session data 134 to the developer service 130.

The developer service 130 may include the simulator 138. The developer service 130 may replay the session data 134 in the simulator 138. The simulator 138 may determine that the error occurred. For example, as described above, the simulator 138 may determine that the image of the particular item has been omitted. The developer service 130 may generate the application update data 140 that includes modified instructions that resolve the error, as described above. For example, the modified instructions may cause the application to display the image of the particular item. The developer service 130 may perform a validation test in the simulator 138 using the application update data 140 to determine that the application remains functional after inclusion of the modified instructions, as described above. The developer service 130 may send the application update data 140 to the user device 102, via the application server 114. In other implementations, the developer service 130 may send the application update data 140 to the user device 102.

Figure 3:
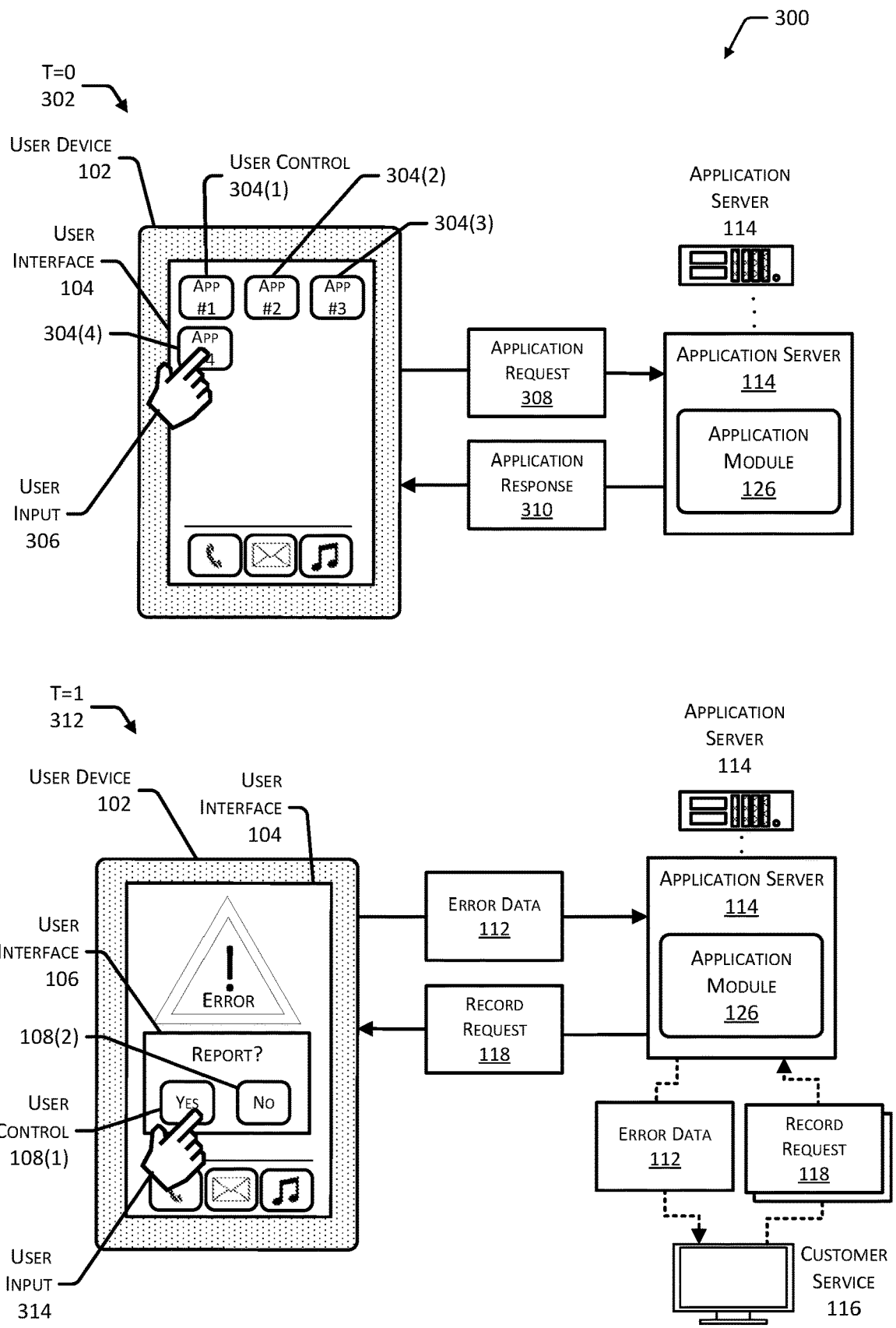
FIGS. 3-5 depict an example for reproducing and resolving application errors.

FIG. 3 is an example 300 for reproducing and resolving application errors. The example 300, at 302 (T=0), includes the user device 102, as described above. The user interface 104 may present user controls 304(1), 304(2), 304(3), 304(4), . . . , 304(D). As used in this disclosure, letters in parenthesis such as "(D)" indicate an integer value. Individual ones of the user controls 304 may correspond to a particular application. For example, the user controls 304 may correspond to a shopping application, entertainment application, lifestyle application, medical application, health and fitness application, music application, social networking application, and so forth. The user device 102 may receive a user input 306 selecting the user control 304(4). For example, the user device 102 may receive the user input 306 selecting to execute a shopping application that is associated with the user control 304(4). The user device 102 may be configured to send an application request 308 to the application server 114. The application request 308 may be similar to the application request 120. For example, the application request 308 may be a user input 306 selecting an application to be executed. In other examples, the application request 308 may be a user input 306 selecting to view a particular item, a user input 306 selecting to purchase an item, a user input 306 navigating the user interface of the application and so forth.

The application server 114, as described above, may include the application module 126. The application module 126 may be configured to generate an application response 310. For example, the application module 126 may receive the application request 308 that indicates that the user selected to launch the shopping application. The application module 126 may generate the application response 310 to include application data that enables the user device 102 to present the shopping application user interface. The application server 114 may send the application response 310 to the user device 102.

At 312 (T=1), the user interface 104 may present the shopping application user interface. During operation of the shopping application an error may occur, as described above. For example, the error may comprise an application fault. For example, the application fault may be from the application attempting to read memory that is not allocated for reading by the application. In other implementations the application fault may be from the application attempting to write to memory that is not allocated for writing by the application, executing an invalid instruction, performing input/output operations on a hardware device to which the application does not have permission to access, or sending an invalid request to an operating system of the user device 102.

In other implementations, the error may comprise the user device 102 omitting a display of an element on the user interface 104, omitting displaying a user control that enables the user to purchase an item, a non-responsive user control, and so forth, as described above.

The user interface 104 may be configured to present the user interface 106. The user interface 106 may include the user controls 108(1) and 108(2) which ask the user whether they would like to report the error, as described above. The user device 102 may receive user input 314 selecting the user control 108(1). The user device 102 may generate the error data 112 in response to the user input 314. The error data 112 may include a ticket that describes that an error occurred, as described above. For example, the ticket may include a ticket number and a description of the error. The user device 102 may send the error data 112 to the application server 114. The application server 114 may send the error data 112 to the customer service 116, as described above.

The customer service 116 may send the record request 118 to the application server 114 and the user device 102. The record request 118 may include instructions that cause the user device 102 to record, with the user's consent, the initial state of the hardware data within the user device 102, as described above. For example, the user device 102 may present a user interface that includes controls that allow the user to confirm or deny recording the initial state of the hardware data. As described above, the user device 102 may record, with the user's consent, the state of the manager controller which indicates the number of applications currently running on the user device 102. The record request 118 may also include instructions to cause the user device 102 to reproduce the error associated with the error data 112.

The record request 118 may also include instructions that cause the application server 114 to record the application request 120 received from the user device 102, the application response 122 that corresponds to the application request 120, and the additional information, as described above. For example, the application server 114 may record the response latency information that indicates elapsed time for an application response 310 to be received.

Figure 4:
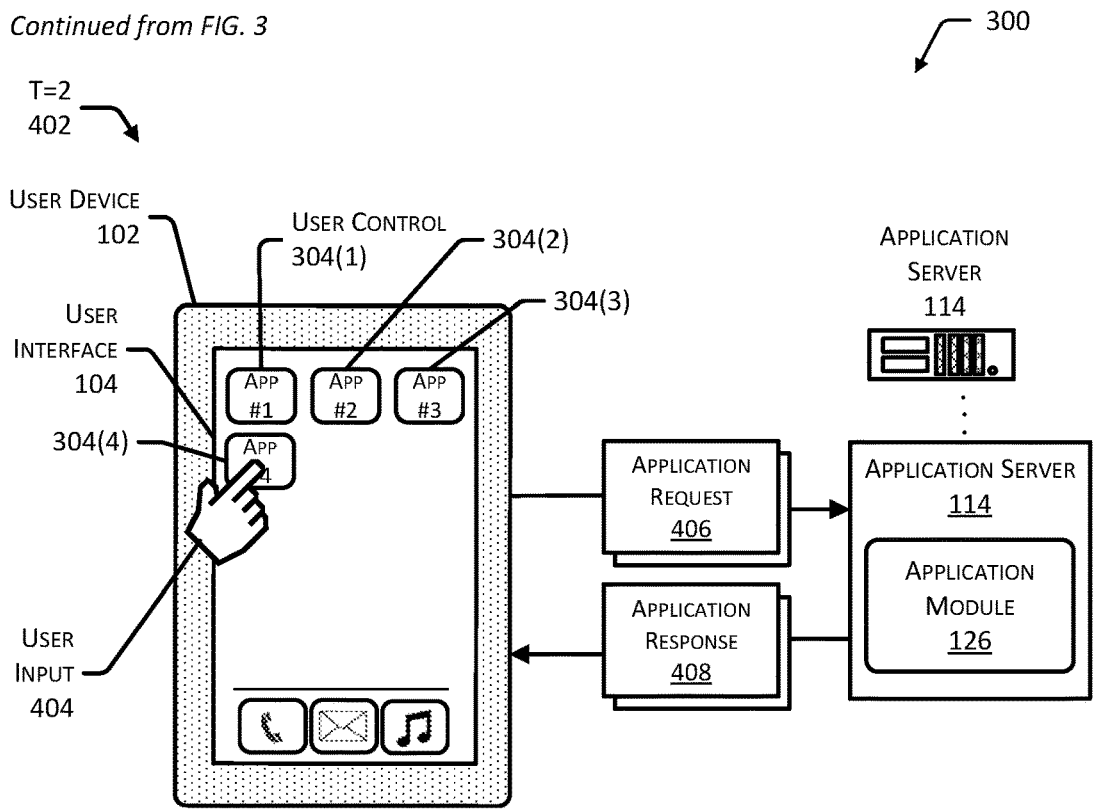
Figure 4:
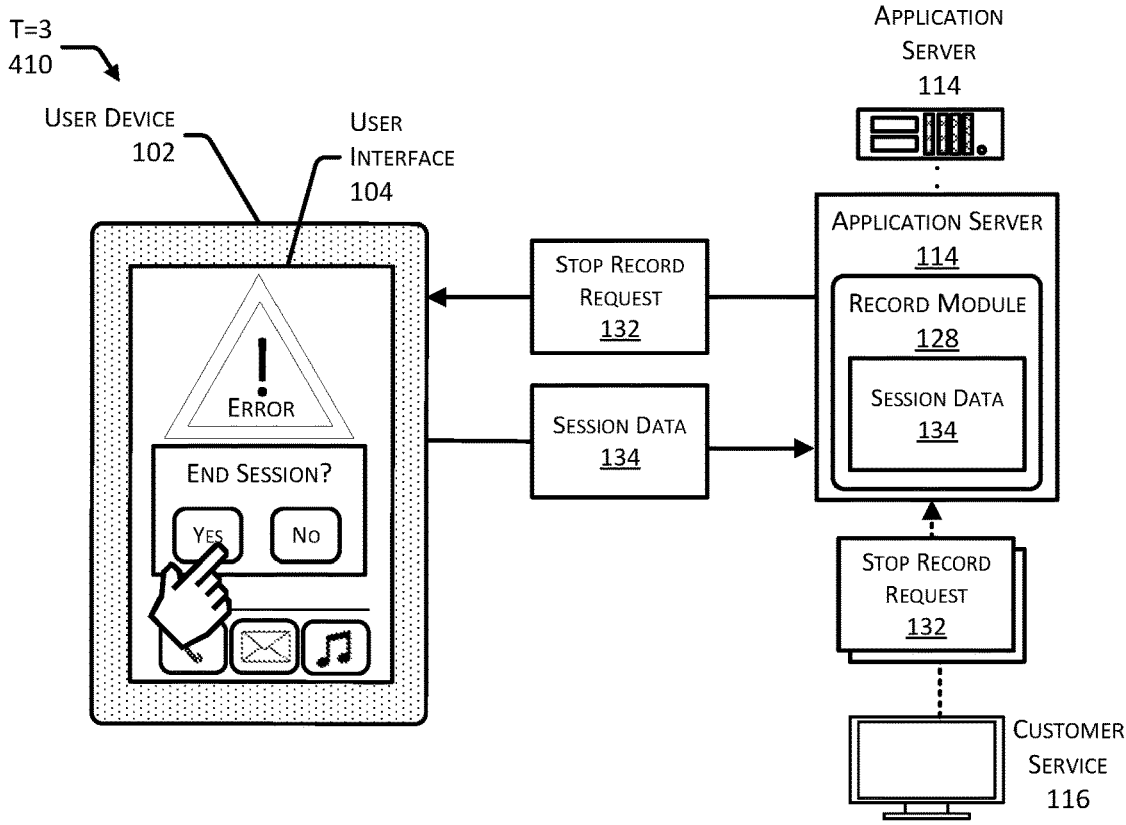

FIG. 4 depicts the continuation of the example 300 from FIG. 3 for reproducing and resolving application errors. At 402 (T=2), the user device 102 may receive user input 404 selecting the user control 304(4). For example, the user device 102 may receive the user input 404 selecting to execute a shopping application that is associated with the user control 304(4). The user device 102 may be configured to send an application request 406 to the application server 114. The application request 406 may be similar to the application request 120. For example, the application request 406 may be a user input 404 selecting an application to be executed. In other examples, the application request 406 may be a user input 404 selecting to view a particular item, a user input 404 selecting to purchase an item, a user input 404 navigating the user interface of the application, and so forth.

The application server 114, as described above, may send the application response 408 to the user device 102, as described above. The application module 126, as described above, may be configured to generate the application response 408. For example, the application module 126 may receive the application request 406 that indicates that the user selected to view a particular item. The application module 126 may generate the application response 408 to include information or application data that enables the user device 102 to present an image of the particular item. The application server 114 may be configured to record the information or the application data, which is stored with the session data 134. The application module 126 may continue to receive the application request 406 and send the corresponding application response 408 until the error has been reproduced on the user device 102.

At 410 (T=3), the user interface 104 may present the shopping application user interface. During operation of the shopping application an error may occur, as described above. The user device 102 may receive the stop record request 132, as described above. The stop record request 132 may be sent from the application server 114 or the customer service 116, as described above. The stop record request 132 may include instructions that cause the application server 114 and the user device 102 to stop the recording session. The user device 102 may be configured to generate the session identification, as described above. The application server 114 may also generate a session identification that corresponds to the session identification generated by the user device 102. The user device 102 may generate the session data 134 to include the recorded initial state of the hardware data, as described above. In other implementations, the session data 134 may include the recorded initial state of the hardware data, the application request 406, and the application response 408. In yet another implementation, the session data 134 may also include user device information that indicates a user device type or an operating system of the user device 102. The session data 134 may also include application information that indicates a software version of the application. The user device 102 may send the session data 134 to the application server 114.

The application server 114 may store the session data 134 within the record module 128, as described above. The record module 128 may combine the session data 134 with its own session data and store the session data 134 as combined. In other implementations, the record module 128 may store the session data 134 and associate it with its own session data.

Figure 5:
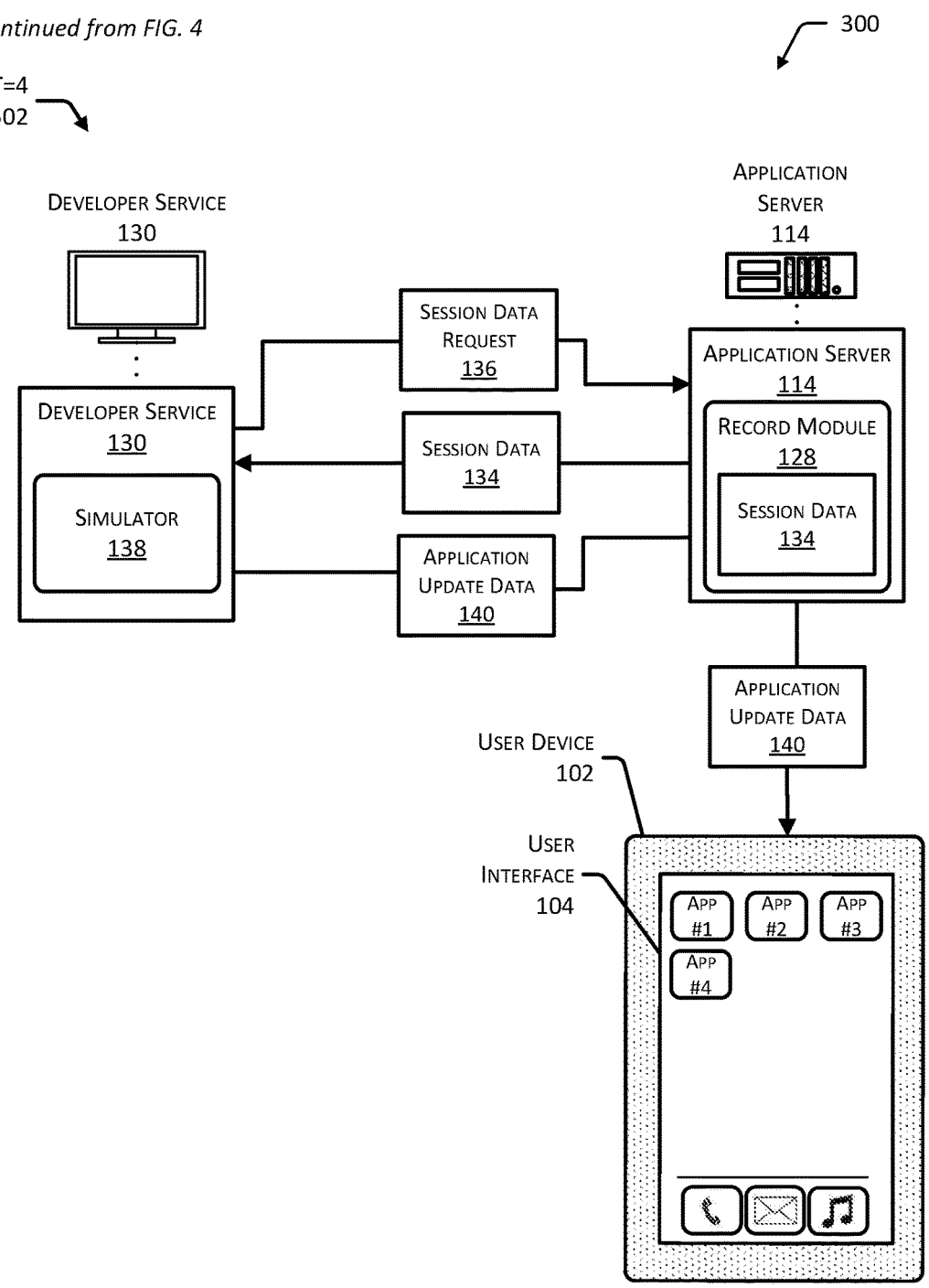

FIG. 5 depicts the continuation of the example 300 from FIGS. 3 and 4 for reproducing and resolving application errors. At 502 (T=4), the developer service 130 may send the session data request 136 to the application server 114, as described above. The session data request 136 may include the session identification, the account number, the ticket number reporting the error, and so forth. The record module 128 may correspond the session identification sent in the session data request 136 to the session identification within the stored session data. For example, the record module 128 may correspond that the session data request 136 corresponds with the session data 134. The application server 114 may send the session data 134 to the developer service 130.

The developer service 130 may include a simulator 138. The developer service 130 may replay the session data 134 in the simulator 138. The simulator 138 may determine that the error occurred, as described above. The developer service 130 may generate application update data 140 that includes modified instructions that resolve the error, as described above. The developer service 130 may perform a validation test in the simulator 138 using the application update data 140 to determine that the application remains functional after inclusion of the modified instructions, as described above. The developer service 130 may send the application update data 140 to the user device 102, via the application server 114. In other implementations, the developer service 130 may send the application update data 140 to the user device 102.

Figure 6:
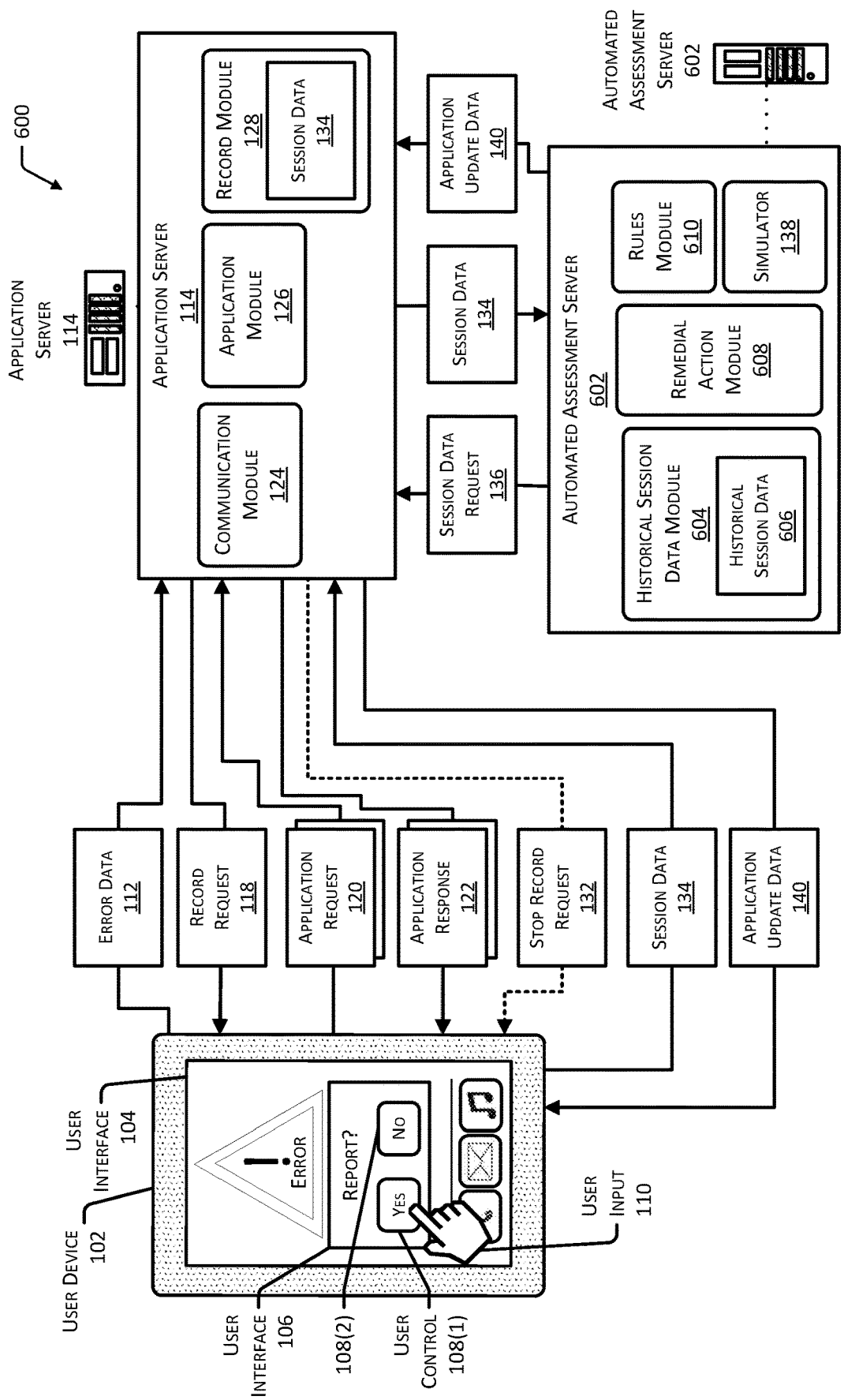
FIG. 6 depicts a schematic of a system for reproducing and resolving application errors.

FIG. 6 depicts a schematic of a system 600 for reproducing and resolving application errors. The system 600 may include the user device 102, as described above. The user device 102 may include the user interface 104. The user interface 104 may be configured to present the application user interface, as described above. For example, the application user interface may be associated with a shopping application. While the user is accessing the application, via the user device 102, an error or issue may occur, as described above. The error may comprise an application fault, omitting a display of an element on the user interface 104, omitting the display of a user control, a non-responsive user control, and so forth, as described above.

The user interface 104 may be configured to present the user interface 106. The user interface 106 may include the user controls 108(1) and 108(2), as described above. The user device 102 may receive the user input 110 selecting the user control 108(1). The user device 102 may generate the error data 112, as described above. The error data 112 may include a ticket that describes that an error occurred. For example, the ticket may include a ticket number that may be used to identify the user, the user device 102 or may be used to retrieve the error data 112 at a later time. The ticket may also include a description of the error. For example, the ticket may describe that a user control is non-operable, an image of an item may not be displayed, that the application is not functioning correctly, and so forth. The user device 102 may send the error data 112 to the application server 114.

In one implementation, the application server 114 may initiate the recording session by sending the record request 118 to the user device 102, as described above. The record request 118 may include instructions that cause the user device 102 to record, with the user's consent, the initial state of the hardware data within the user device 102, as described above. For example, the user device 102 may present a user interface that includes controls that allow the user to confirm or deny recording the initial state of the hardware data. As described above, the user device 102 may record the initial state of the click handler that indicates user interactions within a user interface of the application. In this implementation, the application server 114 may record receiving the application request 120, sending the application response 122, the information or application data included in the application response 122, additional information, or a combination thereof, as described above.

In another implementation, the user device 102, with the user's consent, may initiate the recording session by recording the initial state of the hardware data within the user device 102, as described above. For example, the user device 102 may present a user interface that includes controls that allow the user to confirm or deny the user's consent. The user device 102 may send the record request 118 to the application server 114. The record request 118 may cause the application server 114 to record receiving the application request 120, sending the application response 122, additional information, or a combination thereof, as described above.

In other implementations, the user device 102 may initiate the recording session, recording the initial state of the hardware data, sending the application request 120, receiving the application response 122, additional information, or a combination thereof, as described above.

The application server 114 may receive the application request 120 from the user device 102, as described above. The application server 114 may include the communication module 124, the application module 126, the record module 128, and so forth. The communication module 124 may be configured to send data, requests, responses, and so forth, to the user device 102 or the developer service 130, as described above. The communication module 124 may also be configured to record the application request 120, the application response 122, the additional information, or a combination thereof, as described above.

The application module 126, as described above, may be configured to generate the application response 122. For example, the application module 126 may receive the application request 120 that indicates that the user selected to a user control. The application module 126 may generate the application response 122 to include application data that enables the user device 102 to present the detailed page associated with the user control. The application module 126 may continue to receive the application request 120 and send the corresponding application response 122 until the error has been reproduced on the user device 102.

In one implementation, the user device 102 may determine that the error has occurred. For example, the user device 102 may determine that the element, which was previously omitted as described above, is currently omitted from being displayed. In another example, an application fault may occur causing the application to close. In this example, the closing of the application causes the user device 102 to determine that the error has occurred. The application server 114 may send the stop record request 132 to the user device 102. The stop record request 132 may include instructions that cause the application server 114 and the user device 102 to stop the recording session, as described above. In other implementations, the user device 102 upon determining that the error has occurred may stop the recording session without the receipt of the stop record request 132.

The user device 102 may be configured to generate the session identification to identify the recording session, as described above. For example, the session identification may identify the user device 102, an account number, ticket number reporting the error, date, time, and so forth. The application server 114 may also generate a session identification that corresponds to the session identification generated by the user device 102, as described above. The user device 102 may generate the session data 134, as described above. For example, the session data 134 may include the recorded initial state of the hardware data. The user device 102 may send the session data 134 to the application server 114.

The application server 114 may store the session data 134 within the record module 128, as described above. The application server 114 may receive the session data request 136 from an automated assessment server 602. The session data request 136 may include the session identification, the account number, the ticket number reporting the error, and so forth. The record module 128 may correspond the session identification sent in the session data request 136 to the session identification within the stored session data. For example, the record module 128 may correspond that the session data request 136 corresponds with the session data 134. The application server 114 may send the session data 134 to the automated assessment server 602. In other implementations, the application server 114, upon receiving the session data 134, may send the session data 134 to the automated assessment server 602.

The automated assessment server 602 may include a historical session data module 604. The historical session data module 604 may include historical session data 606. The historical session data 606 may be similar to the second session data, as described above. The historical session data 606 may be indicative of a previously recorded session encountering the error. For example, the user device 102(2) may have previously encountered the error and generated second session data, as described above. A remedial action module 608 may access the historical session data 606 to determine how similar errors have been resolved. The automated assessment server 602 may include the remedial action module 608.

In one implementation, the automated assessment server 602 may include a rules module 610, the simulator 138, and so forth. The automated assessment server 602 may access the error data 112 included in the session data 134 to determine the error. The rules module 610 may include rule data. The rule data may indicate a list of errors that can be resolved by the remedial action module 608. The rules module 610 may determine that the error in the session data 134 corresponds to an error included in the list of errors indicating that the error can be resolved by the remedial action module 608. For example, the list of errors may include that the automated assessment module may resolve errors that include a user-control not being operable. The automated assessment server 602 may replay the session data 134 in the simulator 138. The automated assessment server 602 may determine that the error occurred. The remedial action module 608 may generate the application update data 140, as described above. The simulator 138 may perform the validation test using the application update data 140, as described above. The automated assessment server 602 may send the application update data 140 to the user device 102, via the application server 114. The automated assessment server 602 may also send the application update data 140 directly to the user device 102. In other implementations, where the determined error is not included in the list of errors, the session data 134 may be sent to the developer service 130 to be resolved, as described above.

In another implementation, the automated assessment server 602 may replay the session data 134 in the simulator 138 prior to accessing the rules module 610. The automated assessment server 602 may determine that the error occurred. The rules module 610 may determine whether the remedial action module 608 may resolve the error. As described above, when the error is included in the list the remedial action module 608 may generate the application update 140. When the error is not included in the list then the session data 134 may be sent to the developer service 130, as described above.

In other implementations, the automated assessment server 602 may replay the session data 134 in the simulator 138. The automated assessment server 602 may determine that the error occurred. The remedial action module 608 may generate the application update data 140, as described above. The simulator 138 may perform the validation test using the application update data 140, as described above. The simulator 138 may yield a result that indicates that the application update data 140 generated by the remedial action module 608 generates other errors. In one implementation, the remedial action module 608 may resolve the other errors that were generated. In another implementation, the session data 134 may be sent to the developer service 130 to resolve the original error, as described above.

In some implementations, the application server 114 or the user device 102 may be configured to include the modules located within the automated assessment server 602. In other implementations, the application server 114 or the user device 102 may be configured to perform the actions described above being executed by the modules located within the automated assessment server 602.

In another implementation, the automated assessment server 602 may be configured to monitor the user device 102 to determine whether the user device 102 is compromised. For example, the automated assessment server 602 may include information or process flow information that indicates configurations of user devices that are not compromised. The automated assessment server 602 may replay the session data 134 in the simulator 138 and compare the process flow information of the session data 134 to the stored process flow information. The automated assessment server 602 may determine that the user device 102 is compromised based on a difference in the process flow information of the session data 134 to the stored process flow information. The automated assessment server 602 may generate an alert or notification, as described above.

Figure 7:
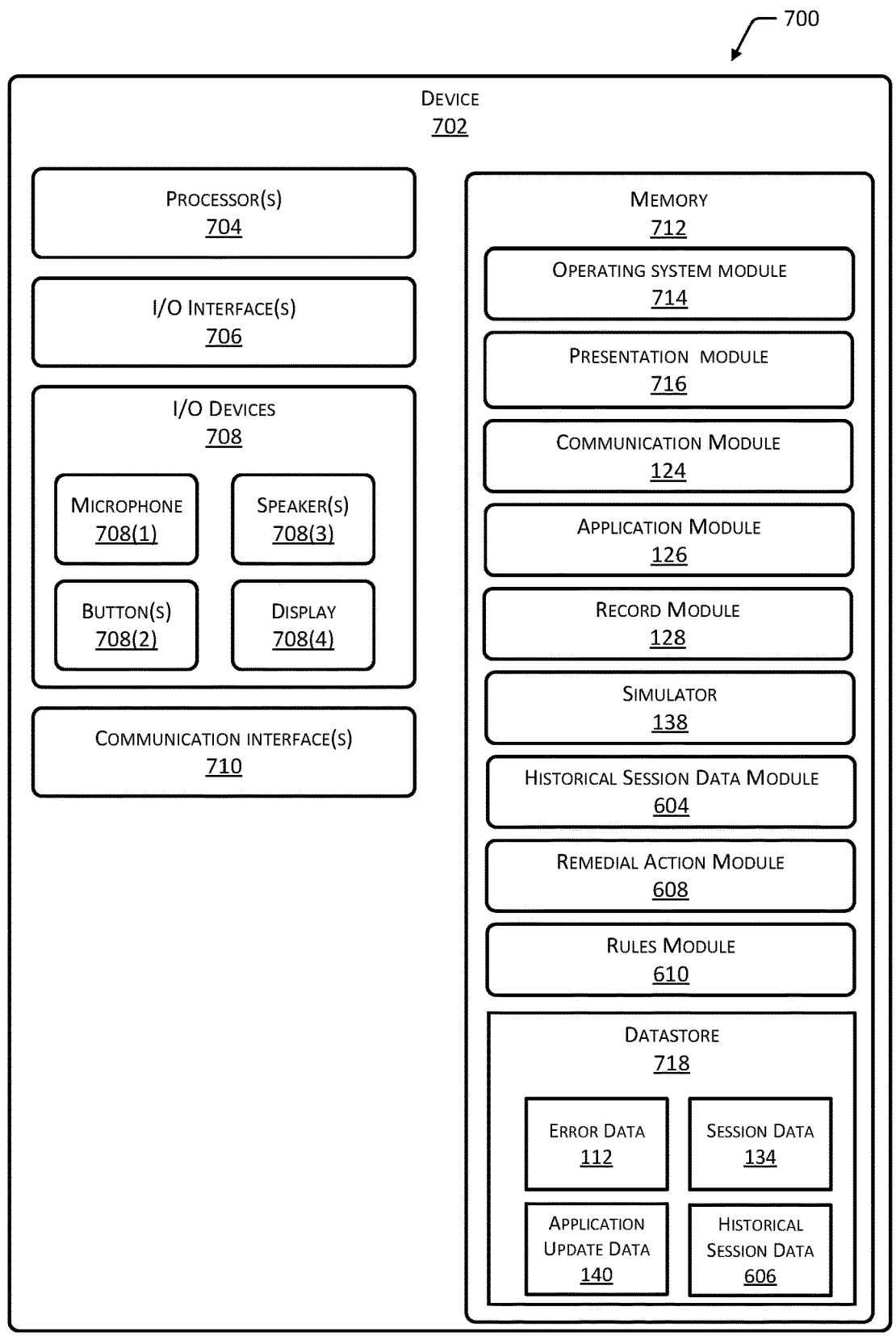
FIG. 7 illustrates a block diagram of a device for reproducing and resolving application errors.

FIG. 7 illustrates a block diagram 700 of a device 702 for reproducing and resolving application errors. The device 702 may be the user device 102, the application server 114, the customer service 116, the developer service 130, the automated assessment server 602, or a combination thereof. The device 702 is illustrative and non-limiting, and may be a desktop computer, a tablet computer, a server, a wearable computer, an e-book reader, a media device, a cellular phone, a laptop computer, or another suitable apparatus. The device 702 may include one or more processors 704 configured to execute one or more stored instructions. The processor(s) 704 may comprise one or more cores, and may also be referred to as hardware processors.

The device 702 may include one or more input/output (I/O) interface(s) 706 to allow the processor(s) 704 or other components of the device 702 to communicate with various other devices 702, other computing devices, the user device 102, the application server 114, the customer service 116, the developer service 130, the automated assessment server 602, other services, and so on. The I/O interfaces 706 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 706 may couple to one or more I/O devices 708. The I/O devices 708 may include one or more input devices such as a keyboard, a mouse, a microphone 708(1), user input buttons 708(2), and so forth. The I/O devices 708 may also include output devices such as audio speakers 708(3), one or more displays 708(4), and so forth. In some embodiments, the I/O devices 708 may be physically incorporated within the device 702, or they may be externally placed. The I/O devices 708 may include various other devices as well.

The device 702 may also include one or more communication interfaces 710. The communication interface(s) 710 are configured to provide communications with other devices, web-based resources, the user device 102, the application server 114, the customer service 116, the developer service 130, the automated assessment server 602, other services, routers, wireless access points, and so forth. The communication interfaces 710 may include wireless functions, devices configured to couple to one or more networks including local area networks (LANs), wireless LANs, wide area networks (WANs), and so forth. The device 702 may also include one or more busses or other internal communications hardware or software that allow for the transfer of data between the various modules and components of the device 702.

The device 702 includes one or more memories 712. The memory 712 comprises one or more computer-readable storage media (CRSM). The memory 712 provides storage of computer readable instructions, which enables the user device 102, to present the user interface 104, the user interface 106, the user controls 108(1), 108(2), 304(1), 304(2), . . . , 304(D), user interfaces associated with an application, data structures, program modules, and other data used during the operation of the user device 102, the application server 114, the customer service 116, the developer service 130, the automated assessment server 602, and so forth. The memory 712 may include at least one operating system (OS) module 714. Respective OS modules 714 are configured to manage hardware devices such as the I/O interface(s) 706, the I/O devices 708, the communication interface(s) 710, and provide various services to applications or modules executing on the processors 704.

Also, stored in the memory 712 may be one or more of the following modules. These modules may be executed as foreground applications, background tasks, daemons, and so forth. A presentation module 716 may be configured to present the user interface 104, the user interface 106, user controls 108(1), 108(2), 304(1) 304(2), . . . , 304(D), the user interface associated with an application, and so forth. For example, the presentation module 716 may comprise a web browser.

The memory 712 may also include the communication module 124. The communication module 124 may be configured to send data, requests, responses, and so forth, as described above. The communication module 124 may send the above described forms of data to the customer service 116, the user device 102, developer service 130, and so forth.

The memory 712 may also include the application module 126. The application module 126 may be configured to generate the application response 122, as described above. For example, the application module 126 may receive the application request 120 that indicates that the user selected to launch the shopping application. The application module 126 may generate the application response 122 to include application data that enables the user device 102 to present the shopping application user interface.

The memory 712 may include the record module 128, as described above. The record module 128 may combine the session data 134 with its own session data and store the session data 134 as combined. In other implementations, the record module 128 may store the session data 134 and associate it with its own session data.

The memory 712 may include the simulator 138, as described above. The simulator 138 may determine that the error occurred. For example, as described above, the simulator 138 may determine an application fault, that a user control is non-operable, an image of an item may not be displayed, that the application is not functioning correctly, and so forth.

The memory 712 may also include the historical session data module 604. The historical session data module 604 may include the historical session data 606, as described above. The historical session data 606 may be similar to the second session data, as described above. The historical session data 606 may be indicative of a previously recorded session encountering the error. For example, the user device 102(2) may have previously encountered the error and generated second session data, as described above.

The memory 712 may include the remedial action module 608. The remedial action module 608 may generate the application update data 140, as described above.

The memory 712 may include the rules module 610. The rules module 610 may determine that the error in the session data 134 corresponds to an error included in the list of errors indicating that the error can be resolved by the remedial action module 608. For example, the list of errors may include that the automated assessment module may resolve errors that include a user-control not being operable.

The memory 712 may also include a datastore 718 to store information. The datastore 718 may use a flat file, database, linked list, tree, executable code, or other data structure to store the information. In some implementations, the datastore 718 or a portion of the datastore 718 may be distributed across one or more of the user device 102, the application server 114, the customer service 116, the developer service 130, the automated assessment server 602, and so forth.

The datastore 718 may store the error data 112, the session data 134, the application update data 140, the historical session data 606, and so forth. As described above, the error data 112 may include a ticket that describes that an error occurred. For example, the ticket may include a ticket number that may be used to identify the user, the user device 102 or may be used to retrieve the error data 112 at a later time. The ticket may also include a description of the error. For example, the ticket may describe that a user control is non-operable, an image of an item may not be displayed, that the application is not functioning correctly, and so forth. The session data 134, as described above, may include the recorded initial state of the hardware data, the application request 120, and the application response 122. In other implementations, the session data 134 may include the recorded initial state of the hardware data. In yet another implementation, the session data 134 may also include user device information that indicates a user device type or an operating system of the user device 102. The session data 134 may also include application information that indicates a software version of the application. The application update data 140 includes modified instructions that resolve the error. For example, the modified instructions may cause the application to function correctly, make a user control operable, display an image correctly, and so forth. The historical session data 606 may be indicative of a previously recorded session encountering the error. For example, the user device 102(2) may have previously encountered the error and generated second session data, as described above.

Figure 8:
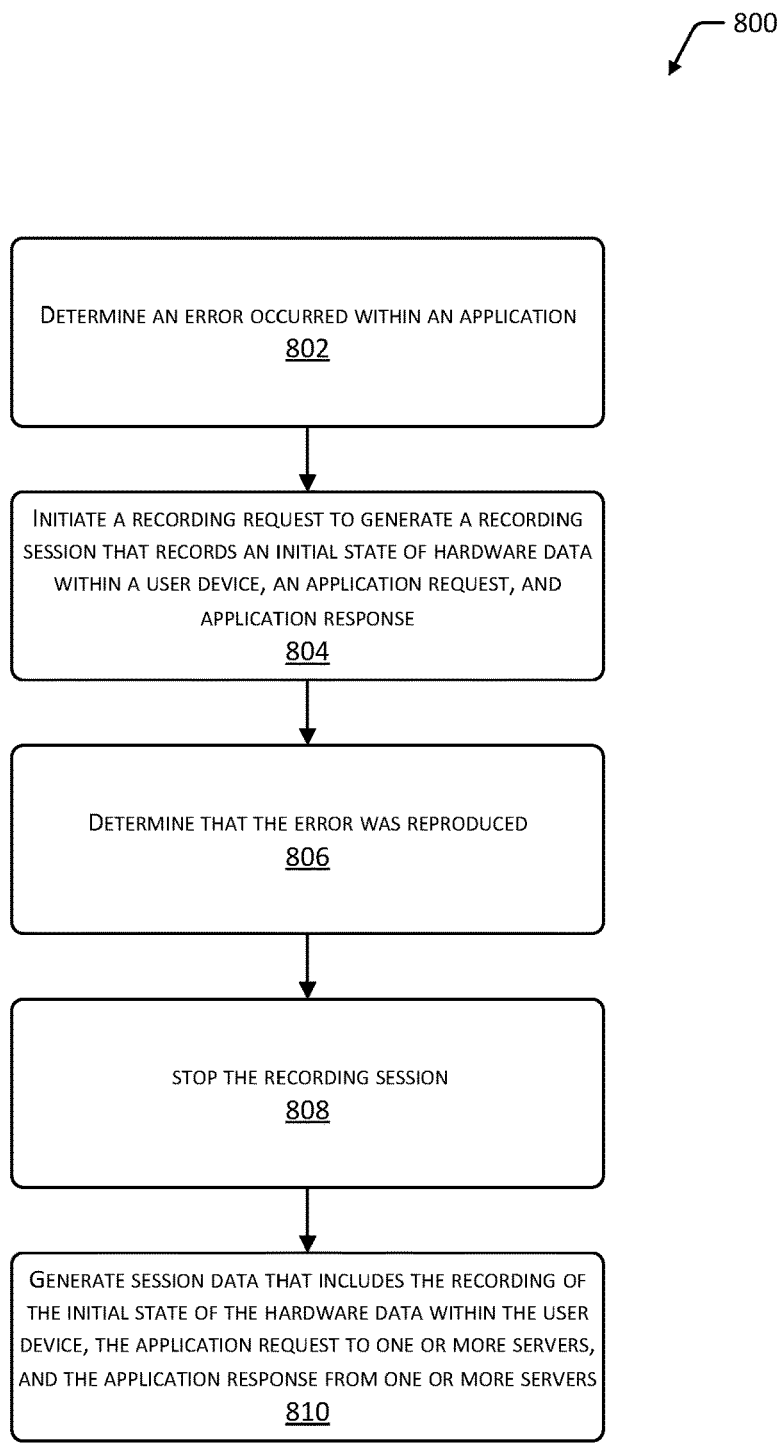
FIG. 8 depicts a flow diagram for reproducing and resolving application errors.

FIG. 8 depicts a flow diagram of a process 800 for reproducing and resolving application errors. Although the process 800 is described with reference to the flowchart illustrated in FIG. 8, many other methods of performing the acts associated with the process 800 may be used. For example, the order of the steps may be changed, some of the steps described may be optional, and additional steps may be included.

At 802, the user device 102 may determine that an error occurred within an application. For example, the error may comprise an application fault. For example, the application fault may be from the application attempting to read memory that is not allocated for reading by the application. In other implementations the application fault may be from the application attempting to write to memory that is not allocated for writing by the application, executing an invalid instruction, performing input/output operations on a hardware device to which the application does not have permission to access, or sending an invalid request to an operating system of the user device 102.

In other implementations, the error may comprise the user device 102 omitting a display of an element on the user interface 104, omitting displaying a user control that enables the user to purchase an item, a non-responsive user control, and so forth, as described above.

At 804, a recording request may be initiated to generate a recording session that records, with the user's consent, an initial state of hardware data within the user device 102, the sending or receiving of the application request 120, and the sending or receiving the application response 122. In one implementation, the user device 102 may, with the user's consent, initiate the recording session. For example, the user device 102 may present a user interface, as described above, that includes controls that allow the user to confirm or deny the user's consent. In this implementation, the user device 102 may record the hardware data, as described above. The user device 102 may send the record request to the application server 114. In other implementations, the user device 102 may record the sending of the application request 120 and the application response 122. The user device 102, upon determining that the error has occurred, may be configured to stop the recording session and generate the session data 134, as described above. In some implementations, the user device 102 may send the stop record request 132 to the application server 114. The user device 102 may send the session data 134 to the application server 114. The application server 114 may store the session data 134, as described above.

In other implementations, the customer service 116 may send a record request 118 to the application server 114 and the user device 102, as described above. The record request 118 may include instructions that cause the user device 102 to record, with the user's consent, the initial state of hardware data within the user device 102. For example, the user device 102 may present a user interface that includes controls that allow the user to confirm or deny recording the initial state of the hardware data. As described above, the user device 102 may record the initial state of the hardware data prior to sending the application request 120. The user device 102 may record the state of the manager controller. For example, the user device 102 may record that the state of the manager controller includes that three (3) applications on the user device 102 are currently running in the foreground or background.

The record request 118 may also include instructions that cause the application server 114 to record the application request 120 received from the user device 102 and the application response 122 that corresponds to the application request 120. In other implementations, the customer service 116 may send the record request 118 to the user device 102. The record request 118 may include instructions to cause the user device 102 to record the application request 120 sent to the application server 114 and the application response 122 sent from the application server 114.

The application server 114 may be configured to receive the application request 120 from the customer service 116, as described above. The application server 114 may record the receiving of the application request 120 and the corresponding application response 122, as described above. The application server 114 may also capture additional information. The additional information may include response sequence information that is included with the application response 122 and indicates that the application response 122 was received. For example, as described above, the communication module 124 may record that the application response 122 may be the third application response that has been sent to the user device 102.

At 806, the user device 102 may determine that the error was reproduced, as described above. For example, the user device 102 may reproduce the application fault.

At 808, stop the recording session. In one implementation, the customer service 116 may send the stop record request 132 to the application server 114 and the user device 102, as described above. The stop record request 132 may include instructions that cause the application server 114 and the user device 102 to stop the recording session. In other implementations, the stop record request 132 may be initiated by the user device 102 or the application server 114, as described above. In another implementation, stopping the recording session may be based on a period of time, upon occurrence of a particular event, and so forth, as described above.

At 810, the user device 102 may generate the session data 134. The session data 134 may include the recorded initial state of the hardware data, the application request to one or more servers, and the application response from the one or more servers, as described above. In other implementations, the session data 134 may include the recorded initial state of the hardware data. In yet another implementation, the session data 134 may also include user device information that indicates a user device type or an operating system of the user device 102. The session data 134 may also include application information that indicates a software version of the application. The user device 102 may send the session data 134 to the application server 114.

The application server 114 may store the session data 134 within the record module 128. The record module 128 may combine the session data 134 with its own session data and store the session data 134 as combined. In other implementations, the record module 128 may store the session data 134 and associate it with its own session data.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

What is claimed is:

1. A system comprising:
a user device comprising:
a display device;
a memory storing computer-executable instructions; and
at least one processor in communication with the display device and the memory, the at least one processor executes the computer-executable instructions to:
present, via the display device, an application user interface that includes an image of an item, item information, and a user control;
receive user input selecting one or more of the image of the item, the item information, or the user control;
based on the user input, determine an error occurred;
generate error data indicative of the error and a description of the error;
send the error data to a customer service device;
receive a record request from the customer service device;
based on the record request, record an initial state of hardware data within the user device that includes at least a recorded initial state of a manager controller that indicates a number of applications currently operating on the user device;
send an application request associated with an application to an application server;
receive an application response associated with the application request from the application server;
determine that the error was reproduced;
receive a stop record request from the customer service device;
generate session data that includes the recorded initial state of the hardware data, the application request, and the application response; and
send the session data to the application server.

2. The system of claim 1, wherein recording the initial state of the hardware data within the user device further comprises one or more of:
record an initial state of a click handler that indicates user interactions within the application user interface, or
record an initial state of the memory that indicates the number of applications communicating with the at least one processor; and
wherein the session data further includes one or more of:
user device information that indicates a user device type or an operating system of the user device, or
application information that indicates a software version of the application.

3. The system of claim 1, further comprising:
a developer user device comprising:
at least one second memory storing computer-executable instructions and a simulator module; and
at least one second processor in communication with the at least one memory, the at least one processor executes second computer-executable instructions to:
receive the session data from the application server;
replay the session data in the simulator module;
determine that the error occurred;
generate application update data that includes modified instructions that resolve the error;
perform a validation test in the simulator module using the application update data to determine that the application remains functional after inclusion of the modified instructions; and
send the application update data to the user device.

4. A method comprising:
determining an error occurred within an application;
initiating a recording request to generate a recording session that records an initial state of hardware data within a user device, an application request to one or more servers, and an application response from the one or more servers;
determining that the error was reproduced; and
generating session data that includes the recording of the initial state of the hardware data within the user device that includes at least a recorded initial state of a manager controller that indicates a number of applications currently operating on the user device, the application request to the one or more servers, and the application response from the one or more servers.

5. The method of claim 4, wherein the recording of the application request to the one or more servers and the application response from the one or more servers captures one or more of:
response sequence information that is included with the application response and indicates that the application response was received,
response timing information that indicates elapsed time between the application request and the application response, or
response latency information that indicates elapsed time for an application response to be received.

6. The method of claim 4, wherein the session data further includes one or more of:
device type information that indicates a user device type or an operating system of the user device, or
application information that indicates a software version of the application.

7. The method of claim 4, further comprising:
replaying the session data with a simulator;
determining that the error occurred;
generating application update data that includes modified instructions that resolve the error; and
performing a validation test in the simulator using the application update data to determine that the application remains functional after inclusion of the modified instructions.

8. The method of claim 4, wherein the recording of the initial state of the hardware data within the user device further comprises the user device:
recording an initial state of a click handler that indicates user interactions within an application user interface, or recording an initial state of memory that indicates the number of applications communicating with at least one processor.

9. The method of claim 4, wherein the error comprises one or more of:
an application fault that causes the application to attempt to do one or more of:
reading memory that is not allocated for reading by the application,
writing memory that is not allocated for writing by the application,
executing invalid instruction,
performing input/output operations on a hardware device to which the application does not have permission to access,
sending an invalid request to an operating system of the user device,
omitting a display of an element on an application user interface, or
a non-responsive user control.

10. The method of claim 4, further comprising:
replaying the session data with a simulator;
accessing rule data that indicates a list of errors that can be resolved by an automated assessment server;
determining that the error in the session data corresponds to an error included in the list of errors indicating that the error can be resolved by the automated assessment server; and
generating application update data that includes modified instructions that resolve the error.

11. The method of claim 4, wherein the recording of the application request to the one or more servers and the application response from the one or more servers further comprises the one or more servers:
recording receipt of the application request; and
recording the application response and the sending of the application response, wherein recording the application response comprises recording information included in the application response.

12. A device comprising:
at least one memory storing computer-executable instructions; and
at least one processor in communication with a display device and the at least one memory, the at least one processor executes the computer-executable instructions to:
receive error data that indicates an error occurred within an application;
send a recording request to cause a user device to generate a recording session that records an initial state of hardware data within the user device that includes at least a recording of an initial state of a manager controller that indicates a number of applications currently operating on the user device;
record receiving an application request;
record sending an application response corresponding to the application request;
receive an indication that the error has occurred;
receive first session data from the user device, the first session data includes the recording session; and
generate second session data that includes the first session data and the recording of receiving the application request, and the sending of the application response.

13. The device of claim 12, wherein the at least one processor of the device further executes computer-executable instructions to:
replay the second session data in a simulator;
determine that the error has occurred;
access third session data indicative of previous recorded sessions encountering the error;
access rule data that indicates a list of errors that can be resolved by an automated assessment module;
determine that the error is included in the list of errors that can be resolved by the automated assessment module;
generate application update data that includes modified instructions that resolve the error based on the second session data and the third session data; and
performing a validation test in the simulator using the application update data to determine that the application remains functional after inclusion of the modified instructions.

14. The device of claim 12, wherein the at least one processor of the device further executes computer-executable instructions to:
replay the second session data in a simulator to encounter the error;
generate application update data that includes modified instructions that resolve the error; and
perform a validation test in the simulator using the application update data to determine that the application remains functional after inclusion of the modified instructions.

15. The device of claim 12, wherein recording the initial state of the hardware data within the user device further comprises one or more of:
record an initial state of a click handler that indicates user interactions within the application user interface, or
record an initial state of the at least one memory that indicates the number of applications communicating with the at least one processor.

16. The device of claim 12, wherein the first session data further includes one or more of:
device type information that indicates a user device type or an operating system of the user device, or
application information that indicates a software version of the application.

17. The device of claim 12, wherein the at least one processor of the device further executes computer-executable instructions to:
replay the second session data to encounter the error;
access rule data that indicates a list of errors that can be resolved by an automated assessment server;
determine that the error is included in the list of errors that can be resolved by the automated assessment server;
send the second session data to the automated assessment server;
receive application update data that includes modified instructions that resolve the error from the automated assessment server; and
perform a validation test in a simulator using the application update data to determine that the application remains functional after inclusion of the modified instructions.

18. The device of claim 12, wherein the recording of the application request and the application response captures one or more of:
information included in the application response that corresponds to the application request, wherein the information includes instructions that cause the user device to perform one or more tasks associated with the application;
response sequence information that is included with the application response and indicates that the application response was received, response timing information that indicates elapsed time between the application request and the application response, or response latency information that indicates elapsed time for an application response to be received.

19. The device of claim 12, wherein the error comprises one or more of:
   an application fault that causes the application to attempt to do one or more of:
      read memory that is not allocated for reading by the application,
      write memory that is not allocated for writing by the application,
      execute invalid instruction,
      perform input/output operations on a hardware device to which the application does not have permission to access,
      send an invalid request to an operating system of the user device,
      omit a display of an element on an application user interface, or
      a non-responsive user control.

20. The device of claim 12, wherein the at least one processor of the device further executes computer-executable instructions to:
   replay the second session data to encounter the error;
   access rule data that indicates a list of errors that can be resolved by an automated assessment server;
   determine that the error is not included in the list of errors that can be resolved by the automated assessment server; and
   send the second session data to a second user device.

* * * * *